(12) United States Patent
Fujimori

(10) Patent No.: US 8,300,063 B2
(45) Date of Patent: Oct. 30, 2012

(54) PROJECTION SYSTEM, INFORMATION PROCESSING APPARATUS

(75) Inventor: Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1262 days.

(21) Appl. No.: 11/470,157

(22) Filed: Sep. 5, 2006

(65) Prior Publication Data

US 2007/0058090 A1    Mar. 15, 2007

(30) Foreign Application Priority Data

Sep. 9, 2005 (JP) ................. 2005-262759

(51) Int. Cl.
*G09G 5/00* (2006.01)
(52) U.S. Cl. ...................... 345/619; 345/589
(58) Field of Classification Search .............. 345/619, 345/589

See application file for complete search history.

(56) References Cited

U.S. PATENT DOCUMENTS

| | | | |
|---|---|---|---|
| 6,305,805 B1 * | 10/2001 | Liebenow | 353/69 |
| 6,367,933 B1 * | 4/2002 | Chen et al. | 353/69 |
| 6,837,582 B2 | 1/2005 | Yamagishi | |
| 7,133,036 B2 * | 11/2006 | Martin et al. | 345/204 |
| 7,266,240 B2 | 9/2007 | Matsuda | |
| 2002/0024640 A1 * | 2/2002 | Ioka | 353/94 |
| 2003/0080968 A1 * | 5/2003 | Niikawa et al. | 345/589 |
| 2003/0210381 A1 * | 11/2003 | Itaki | 353/70 |
| 2003/0234794 A1 * | 12/2003 | Kanai | 345/600 |
| 2005/0013492 A1 * | 1/2005 | Hattori | 382/232 |
| 2005/0018144 A1 * | 1/2005 | Wada et al. | 353/69 |
| 2005/0041045 A1 * | 2/2005 | Plut | 345/660 |
| 2005/0046804 A1 * | 3/2005 | Akutsu | 353/70 |
| 2005/0162620 A1 | 7/2005 | Taguchi et al. | |
| 2006/0203207 A1 * | 9/2006 | Ikeda et al. | 353/70 |
| 2006/0215115 A1 * | 9/2006 | Long et al. | 352/38 |

FOREIGN PATENT DOCUMENTS

| | | |
|---|---|---|
| CN | 1447595 A | 10/2003 |
| CN | 1591385 A | 3/2005 |
| CN | 1645240 A | 7/2005 |
| JP | A-6-105303 | 4/1994 |
| JP | A-2003-50694 | 2/2003 |
| JP | A 2004-69996 | 3/2004 |
| JP | A-2004-304265 | 10/2004 |
| JP | A-2005-150818 | 6/2005 |

\* cited by examiner

*Primary Examiner* — Maurice L McDowell, Jr.
(74) *Attorney, Agent, or Firm* — Oliff & Berridge, PLC

(57) ABSTRACT

A projection system includes an information processing apparatus; a projector; and a signal transmission unit that carries signals between the information processing apparatus and the projector. The information processing apparatus includes a shape conversion unit that generates shape-converted image data that is properly represented when projected from the projector; a converted-image preservation unit that sequentially preserves the shape-converted image data; a modified-part detection unit that compares latest shape-converted image data with preceding shape-converted image data, and detects, as a modified part, part of the latest shape-converted image data that is modified from the preceding shape-converted image data; and a modified-image data generation unit that generates modified-image data of the modified part by adding color-tone data to each pixel in the modified part, and where the projector includes a current-image frame generation unit that generates a new current-image frame based on the modified-image data.

7 Claims, 14 Drawing Sheets

PROJECTION SYSTEM, INFORMATION PROCESSING APPARATUS

BACKGROUND

1. Technical Field

The present invention relates to a projection system and information processing apparatus.

2. Related Art

In general, a projector is well known as an image projection apparatus.

There is also well known a projection system that includes a PC serving as an information processing apparatus that carries out shape correction or color-color-tone correction of an image source, a projector that projects an image corrected by the PC on a screen, and a USB cable serving as a data transmission path between the PC and the projector (see JP-A-2004-69996).

In the projection system, the image source inputted to the PC is image-processed by an image processing unit of the PC. Examples of the image processing include trapezoid correction for correcting trapezoid distortion produced by a disposition between the projector and the screen, or color-color-tone correction for correcting unevenness of luminance or color produced by color characteristics of the projector. Image data that is image-processed by the PC is transmitted to the projector via the USB cable. When the image data is projected from the projector onto the screen, a predetermined image is displayed on the screen.

In the above-mentioned construction, since the image processing is carried out mainly on the PC, and the projector just projects the image data but does not carry out complex image processing, it is possible to simplify the construction of projector. In addition, since the PC has a graphic processing function, it is possible to carry out high-precision image correction without adding new functions to the PC.

In a case where an image source is a moving image, when the transmission rate of USB cable is low, it takes long time for single image data to be transmitted. Thus, the frame rate of image displayed by the projector becomes low, such that the moving image is not properly played. For instance, since the frame rate required for satisfactory playback of moving image is 30 frames/sec, it is not possible to transmit the whole image data using the USB2.0 cable. For instance, while a stable communication rate for the USB2.0 cable is about 240 Mbps, an image having XGA resolution (1024×768 dots) and color information of 30 bits/pixel has about a data amount of 25 Mbits. In this case, the image data can be transmitted only at a frame rate of 9 frames/sec. Even though the communication is made at a maximum communication rate of 480 Mbps in theory, the frame rate is just 18 frames/sec, which is not appropriate for playback of the moving image.

JP-A-2004-69996 discloses that the frame rate is maintained at an appropriate level by reducing a necessary amount of transmitted data by 'differential data transmission of preceding image data' (see paragraph 0048 of JP-A-2004-69996) In JP-A-2004-69996, the PC generates and transmits differential data to the projector, and the projector generates current-image frame data by synthesizing the preceding image and the differential data. The current-image frame data is projected from the projector onto the screen.

While JP-A-2004-69996 proposes that the transmission data is reduced by 'differential data transmission', it does not disclose a method of generating the 'differential data'. In order to properly display images projected by a projector onto a screen, image data is required to be subject to shape correction, such as trapezoid correction, or color-color-tone correction, such as unevenness of color. At this time, it is a problem how to generate the differential data that is required to properly represent current-image frame data required for appropriate image projection by mean of the protector.

SUMMARY

An advantage of some aspects of the present invention is to provide a projection system, information processing apparatus, method of generating modified-image data, program for generating modified-image data, and recording medium for recording the program, which can appropriately represent current-image frame data by a projector.

According to an aspect of the invention, there is provided a projection system including: an information processing apparatus that carries out predetermined image processing on an input image source; a projector that projects an image on a screen based on an image data signal outputted from the information processing apparatus; and a signal transmission unit that carries signals between the information processing apparatus and the projector, where the information processing apparatus includes: a shape conversion unit that generates shape-converted image data converted such that the image data is properly represented on the screen when the image data is projected from the projector towards the screen; a converted-image preservation unit that preserves the shape-converted image data that is shape-converted by the shape conversion unit; a modified-part detection unit that compares latest shape-converted image data, which is shape-converted by the shape conversion unit, with preceding shape-converted image data, which is preserved in the converted-image preservation unit, and detects, as a modified part, part of the latest shape-converted image data that is modified from the preceding shape-converted image data; and a modified-image data generation unit that generates modified-image data of the modified part by adding color-color-tone data to each pixel in the modified part detected by the modified-part detection unit, and where the projector includes a current-image frame generation unit that generates a new current-image frame based on the modified-image data from the information processing apparatus.

In the above-mentioned construction, the information processing apparatus performs image processing on the image source and transmits the image data signal to the projector. The projector generates the current-image frame data based on the received image data signal, and projects the current-image frame data onto the screen to display the image.

In the information processing apparatus, the image data is shape-converted by the shape conversion unit.

The term 'shape conversion' implies that the image data is shape-converted such that the image projected from the projector is appropriately shaped on the screen. For example, trapezoid correction is the case. The shape-converted image data is sent to the converted-image preservation unit and sequentially stored therein and, at the same time, to the modified-part detection unit to be compared with preceding shape-converted image data.

The modified-part detection unit detects, as a modified part, part of the latest shape-converted image data that is modified from the preceding shape-converted image data.

The modified part detected by the modified-part detection unit is a modified 'part' when the preceding image is changed to a current image. At this time, color information is not included in the modified part. Accordingly, the modified-image data generation unit generates the modified-image data of the modified part by adding color-tone data to each pixel in the modified part. The modified-image data is transmitted to the projector through the signal transmission unit. The current-image frame data is generated in the projector based on the modified-image data. That is, since the modified part, which is part of the latest image data modified from the preceding shape-converted image data, and the color-tone data of the modified part are transmitted as the modified-image data from the information processing apparatus to the projector, latest current-image frame data that is obtained, for example, by synthesizing the current data projected by the projector with the modified-image data is generated in the current-image frame generation unit. The current-image frame data is projected from the projector onto the screen, such that an image is displayed on the screen.

In the above-mentioned construction, since the information processing apparatus performs image processing, such as shape conversion, and transmits the image data signal to the projector, the projector needs not to have complex functions to perform image processing. Accordingly, it is possible to simplify the construction of projector. In addition, for example, when a PC is used as the information processing apparatus, the graphic processing function of PC can be utilized. Accordingly, it is not necessary to provide additional image processing function, and it is possible to perform high-speed and high-accuracy image processing by using the graphic processing function of PC.

Since the modified part and the color-tone data of the modified part is transmitted as the modified-image data from the information processing apparatus to the projector; it is possible to remarkably reduce the amount of data to be transmitted, for example, compared to a case where all data constituting a single image frame is transmitted. The signal transmission unit generally has a predetermined maximum transmission rate. Thus, when the amount of data transmitted from the information processing apparatus to the projector is too large, it takes long time to transmit the data from the information processing apparatus to the projector. As a result, the display timing of projector is deviated from that of the image source.

In this regard, since the modified-image data, instead of a single image frame, is transmitted from the information processing apparatus to the projector in the present invention, it is possible to appropriately maintain the frame rate of the image displayed by the projector by reducing the amount of data to be transmitted.

Since the information processing apparatus detects the modified part by comparing shape-converted image data with each other that are shape-converted by the shape conversion unit, and detects a shape-modified portion after processing, it is possible to properly detect the modified part in the shape-modified portion.

For instance, the shape-converted, modified part may be generated by detecting the modified part at image source step prior to shape conversion and shape-converting the detected modified-part. It is possible to generate shape-converted current-image frame data of the shape-converted modified-part by the projector. However, even though the image source is not changed, shape conversion parameters may be changed. For example, when the position of projector is changed, the angle or distance between the screen and projector is changed. In this case, when the shape conversion parameters are changed, the shape of image to be protected by the projector is changed. However, if the image source itself is not changed at all, there is no modified part in image source step. Accordingly, it is not possible to perform shape conversion of the modified part on which a change of shape conversion parameter is reflected. Accordingly, when the modified part is detected at the image source step prior to shape conversion, it is not possible to transmit appropriate modified-image data to the protector and to display an appropriate image by the projector even though the shape conversion of modified part is carried out after the image source step.

In the present invention, the shape conversion is performed before the modified-part detection unit detects the modified part, and the modified part is detected after the shape is determined. Accordingly, it is possible to detect the modified part on which a change in the image source as well as a change in the shape conversion parameter are reflected.

As a result, it is possible to appropriately represent an image by generating current-image frame data by the projector based on the transmitted modified-image data.

The modified-image data is a modified one in terms of the part, but color-tone data is used for color-tone. Accordingly, when the current-image frame data is generated in the projector, it is not necessary to obtain the color information from differential data. As a result, it is possible to reduce some functions of the projector, such that the construction of projector is simplified.

That is, according to an aspect of the invention, it is possible to simplify the construction of projector, and to properly display the image, with frame rate maintained, by the modified-image data transmitted from the information processing apparatus.

The signal transmission unit may be cables, such as USB cable, or wireless communication means.

When the modified-part detection unit compares image data to detect the modified part, the modified-part detection unit may compare the image data in pixel units or in group units consisting of a plurality of pixels.

It is preferable that the information processing apparatus includes: a color-tone correction unit that performs color-tone correction of the shape-converted image data that is shape-converted by the shape conversion unit according to color characteristics of the projector; and a color-tone data extracting unit that extracts color information of each pixel in the modified part detected by the modified-part detection unit from the image data that is color-tone-corrected by the color-tone correction unit, where the modified-image data generation unit generates modified-image data by adding the color information extracted from the color-tone data extracting unit to each pixel in the modified part, and the modified-part detection unit detects a modified part by comparing shape-converted image data with each other that are shape-converted by the shape conversion unit but are not color-tone-corrected by the color-tone correction unit.

In the above-mentioned construction, the shape-converted image data that is shape-converted by the shape conversion unit is sent to the color-tone correction unit. The color-tone correction unit carries out color-tone correction of the shape-converted image data. Examples of the color-tone correction based on color characteristic of the projector include color conversion, $\gamma$ correction, VT-$\gamma$ correction, and color unevenness correction.

Since the modified part is detected by the modified-part detection unit, the modified part and the color-tone-corrected shape-converted image data are sent to the color-tone data extracting unit.

In the color-tone data extracting unit, the color-tone-corrected shape-converted image data and the modified part are compared to extract color-tone data of each pixel in the modified part. The modified-image data is generated in the modified-image data generation unit by adding the color-tone data to each pixel of the modified part.

In the above-mentioned construction, the modified part is detected by the modified-part detection unit by comparing image data prior to color-tone correction. After color-tone correction is carried out, color information of each pixel is accurately corrected. Accordingly, there is a problem in that when the image data is compared with each other after color-tone correction, the roughly whole image is detected as a modified part.

However, in the present invention, since the modified part is detected by comparing image data after shape conversion and before color-tone correction, it is possible to appropriately detect the modified part in the image source.

It is preferable that the information processing apparatus includes a color-tone correction unit that carries out color-tone correction of the shape-converted image data that is shape-converted by the shape conversion unit according to color characteristics of the projector, the converted-image preservation unit preserves the shape-converted image data that is color-tone-corrected by the color-tone correction unit, and the modified-part detection unit compares latest shape-converted image data, which is color-tone-corrected by the color-tone correction unit, with preceding color-tone-corrected, shape-converted image data, which is preserved in the converted-image preservation unit, and detects, as a modified part, part of the latest shape-converted image data that is modified from the preceding shape-converted image data.

In the above-mentioned construction, the shape-converted image data that is shape-converted by the shape conversion unit is color-tone-corrected by the color-tone correction unit. The color-tone-corrected shape-converted image data is preserved in the converted-image preservation unit. The modified part is detected by the modified-part detection unit by comparing the color-tone-corrected shape-converted image data with each other.

In the above-mentioned construction, since the color-tone correction is carried out after shape conversion, the shape conversion and color-tone correction can be successively carried out through a series of graphic processes of the information processing apparatus. For instance, when the modified part is detected after shape conversion and before color-tone correction, the image data is sent to the modified-part detection unit after the shape conversion. Accordingly, a series of graphic processes of the shape conversion and color-tone correction needs to be interrupted.

However, in the present invention, since the shape conversion and color-tone correction can be successively carried out, high-speed graphic processing is achieved.

When the color-tone-corrected image data are compared with each other, it is preferable to reduce the detection accuracy if the roughly whole image is detected as a modified part. For instance, in a case where color-tone of each pixel in image data has 8-bit data, it may be detected with a precision less than 8 bit (e.g., 6- or 4-bit) whether or not each pixel is modified. When the color-tone of each pixel in image data is displayed in 256 grayscale (corresponding to 8 bits), only pixels having a difference of a predetermined threshold value or more (for example, 10 grayscale or more (corresponding to 5 bits)) may be detected.

It is preferable that the information processing apparatus includes a color-tone data extracting unit that extracts color information of each pixel in the modified part detected by the modified-part detection unit from the image data that is color-tone-corrected by the color-tone correction unit, and the modified-image data generation unit generates modified-image data by adding the color information extracted from the color-tone data extracting unit to each pixel in the modified part.

In the above-mentioned construction, since the modified part is detected by the modified-part detection unit, the modified part and the color-tone-corrected shape-converted image data are sent to the color-tone data extracting unit. In the color-tone data extracting unit, color-tone data of each pixel in the modified part is extracted by comparing the color-tone-corrected shape-converted image data and the modified part. In the modified-image data generation unit, the modified-image data is generated by adding color-tone data to each pixel of the modified part.

It is preferable that the information processing apparatus transmits the entire shape-converted, color-tone-corrected image data rather than the modified-image data to the projector in predetermined timing.

In the above-mentioned construction, the shape-converted, color-tone-corrected image data is transmitted from the information processing apparatus to the projector in predetermined timing.

The transmitted image data is projected by the projector onto the screen as such.

The projector stores the entire transmitted image data and synthesizes the image data with next modified-image data transmitted from the information processing apparatus to generate latest image frame data.

When the modified-image data is transmitted from the information processing apparatus to the projector, errors created upon generation of modified-image data in the information processing apparatus or upon generation of latest image data in the projector may cause a difference between image data preserved by the information processing apparatus and projector. When there occurs a difference between image data preserved by the information processing apparatus and projector, it is not possible to generate desired image frame data even though the modified-image data transmitted from the information processing apparatus is synthesized with the image data preserved in the projector.

However, in the present invention, since the entire image data is transmitted in appropriate timing from the information processing apparatus to the projector, it is possible to match the image data preserved in the information processing apparatus and projector in a predetermined timing. Accordingly, the projector can generate latest image frame data based on the modified-image data transmitted from the information processing apparatus.

For example, the image data may be transmitted from the information processing apparatus to the projector in a timing of tens of frames.

According to another aspect of the present invention, there is provided a projection system including: an information processing apparatus that carries out image processing on an input image source; a projector that projects an image on a screen based on an image data signal outputted from the information processing apparatus; and a signal transmission unit that carries signals between the information processing apparatus and the projector, where the information processing apparatus includes: a shape conversion unit that generates shape-converted image data converted such that the image data is properly represented on the screen when the image data is projected from the projector towards the screen; a modified-part detection unit that compares latest shape-converted image data, which is shape-converted by the shape conversion unit, with preceding shape-converted image data, and detects, as a modified part, part of the latest shape-converted image data that is modified from the preceding shape-converted image data; a modified-image data generation unit that generates modified-image data of the modified part by adding color information to each pixel in the modified part detected by the modified-part detection unit; a current-image generation unit that generates latest current-image data based on the modified-image data generated by the modified-image data generation unit; and an image preservation unit that preserves image data generated by the current-image generation unit, where the modified-part detection unit compares latest shape-converted image data, which is shape-converted by the shape conversion unit, with preceding image data, which is preserved in the image preservation unit, and detects, as a modified part, part of the latest shape-converted image data that is modified from the preceding shape-converted image data.

In the above-mentioned construction, the image data is shape-converted by the shape conversion unit of the information processing apparatus. The shape-converted image data is sent to the modified-part detection unit and compared with preceding shape-converted image data. Part of the latest shape-converted image data that is modified from the preceding shape-converted image data is detected as a modified part. In the modified-image data generation unit, modified-image data is generated by adding color-tone data to each pixel of the modified part.

The modified-image data is transmitted to the projector through the signal transmission unit. The current-image frame data is generated in the projector based on the modified-image data. The current-image frame data is projected from the projector onto the screen, such that an image is displayed on the screen.

On the other hand, the modified-image data generated by the modified-image data generation unit is fed back to the current-image generation unit.

The current-image generation unit generates latest current-image data based on the modified-image data.

The current-image data is preserved in the image preservation unit. When the modified part is detected by the modified-part detection unit, the latest shape-converted image data that is shape-converted by the shape conversion unit is compared with the image data preserved in the image preservation unit.

In the above-mentioned construction, since the modified-image data generated by the modified-image data generation unit is fed back to the current-image generation unit to generate the current-image frame data, the current-image generation unit receives the same image data as that transmitted from the information processing apparatus to the projector, and generates the image data equal to the current-image frame data being currently preserved by the projector.

Since the current-image data generated by the current-image generation unit is compared with the latest shape-converted image data, part of the latest shape-converted image data that is modified from the image data equal to the current-image data preserved by the projector is detected as a modified part.

Part of the latest shape-converted image data that is modified from the preceding shape-converted image data is detected as a modified part. Accordingly, there is a problem in that when 'the preceding shape-converted image data' which is the basis of comparison at the time of detecting the modified part is different from the current-image data currently preserved in the projector, appropriate current-image frame data is not generated even though the modified-image data transmitted from the information processing apparatus to the projector is synthesized with the current-image data preserved in the projector.

The modified-image data is transmitted and the current-image frame data is generated based on the modified-image data in the projector. When the shape-converted image data that is shape-converted by the shape conversion unit is preserved in the information processing apparatus, errors created upon generation of the modified-image data are accumulated only in the projector. The modified-image data generated in the information processing apparatus is transmitted to the projector. Even though the modified-image data is synthesized with the image data being currently preserved in the projector, desired current-image frame data is not generated due to the accumulated errors.

However, in the present invention, the modified-image data is transmitted to the projector and fed back to the information processing apparatus, such that the current-image data generated by the same process as that of the projector is preserved as image data to be compared with. Accordingly, the information processing apparatus preserves the same image data as the projector regardless of the error created upon generation of the modified-image data. Accordingly, when the modified-image data is generated in the information processing apparatus, part of the latest shape-converted image data that is modified from the image data preserved by the projector can be generated as modified-image data.

As a result, when the modified-image data is transmitted to the projector, the projector can appropriately generate the latest current-image frame data.

According to another aspect of the present invention, there is provided an information processing apparatus performing predetermined image processing on an input image source, outputting and displaying the image-processed image source on a projector connected via a signal transmission unit, the information processing apparatus including: a shape conversion unit that generates shape-converted image data converted such that the image data is properly represented on the screen wren the image data is projected from the projector towards the screen; a converted-image preservation unit that sequentially preserves the shape-converted image data that is shape-converted by the shape conversion unit; a modified-part detection unit that compares latest shape-converted image data, which is shape-converted by the shape conversion unit, with preceding shape-converted image data, which is preserved in the converted-image preservation unit, and detects, as a modified part, part of the latest shape-converted image data that is modified from the preceding shape-converted image data; and a modified-image data generation unit that generates the modified-image data of the modified part by adding color-tone data to each pixel in the modified part detected by the modified-part detection unit.

The information processing apparatus having the above-mentioned construction can be appropriately used to the projection system.

According to another aspect of the present invention, there is provided a method of generating modified-image data transmitted from an information processing apparatus to a projector in a projection system including the information processing apparatus that carries out image processing on an input image source, the projector that projects an image on a screen based on an image data signal outputted from the information processing apparatus, and a signal transmission unit that carries signals between the information processing apparatus and the projector, the method including: generating shape-converted image data converted such that the image data is properly represented on the screen when the image data is projected from the projector towards the screen; sequentially preserving the shape-converted image data, which is shape-converted by the operation of generating shape-converted image; comparing latest shape-converted image data, which is shape-converted by the operation of generating shape-converted image, with preceding shape-converted image data, which is preserved in a converted-image preservation unit, and detecting, as a modified part, part of the latest shape-converted image data that is modified from the preceding shape-converted image data; and generating converted-image data of the modified part by adding color-tone data to each pixel in the modified part detected by the operation of detecting as a modified part.

With the above-mentioned configuration, similar advantages as the above embodiments can be attained.

That is possible to simplify the construction of the projector and to appropriately display the image, with the frame rate maintained, by the appropriately modified-image data transmitted from the information processing apparatus.

According to another aspect of the present invention, there is provided a modified-image data generation program that executes the above-mentioned method of generating the modified-image data on the information processing apparatus.

According to another aspect of the present invention, there is provided a recording medium that stores the above-mentioned modified-image data generation program.

For example, after CPU or memory unit is provided in the information processing apparatus so that it can act as a computer, predetermined programs are installed into the memory unit through communication means such as Internet, or recording medium such as CD-ROM, or memory card, and then CPU is operated by the programs to execute individual processes. The programs can be installed through the memory card or CD-ROM that is provided directly or through an external device capable of reading the medium, connected to an electronic device. In addition, the programs can be installed through LAN cables or telephone lines or through wireless connection to communication network.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the present invention will be described in detail with reference to the accompanying drawings.

First Embodiment

A projection system according to a first embodiment of the invention will be described.

Figure 1:
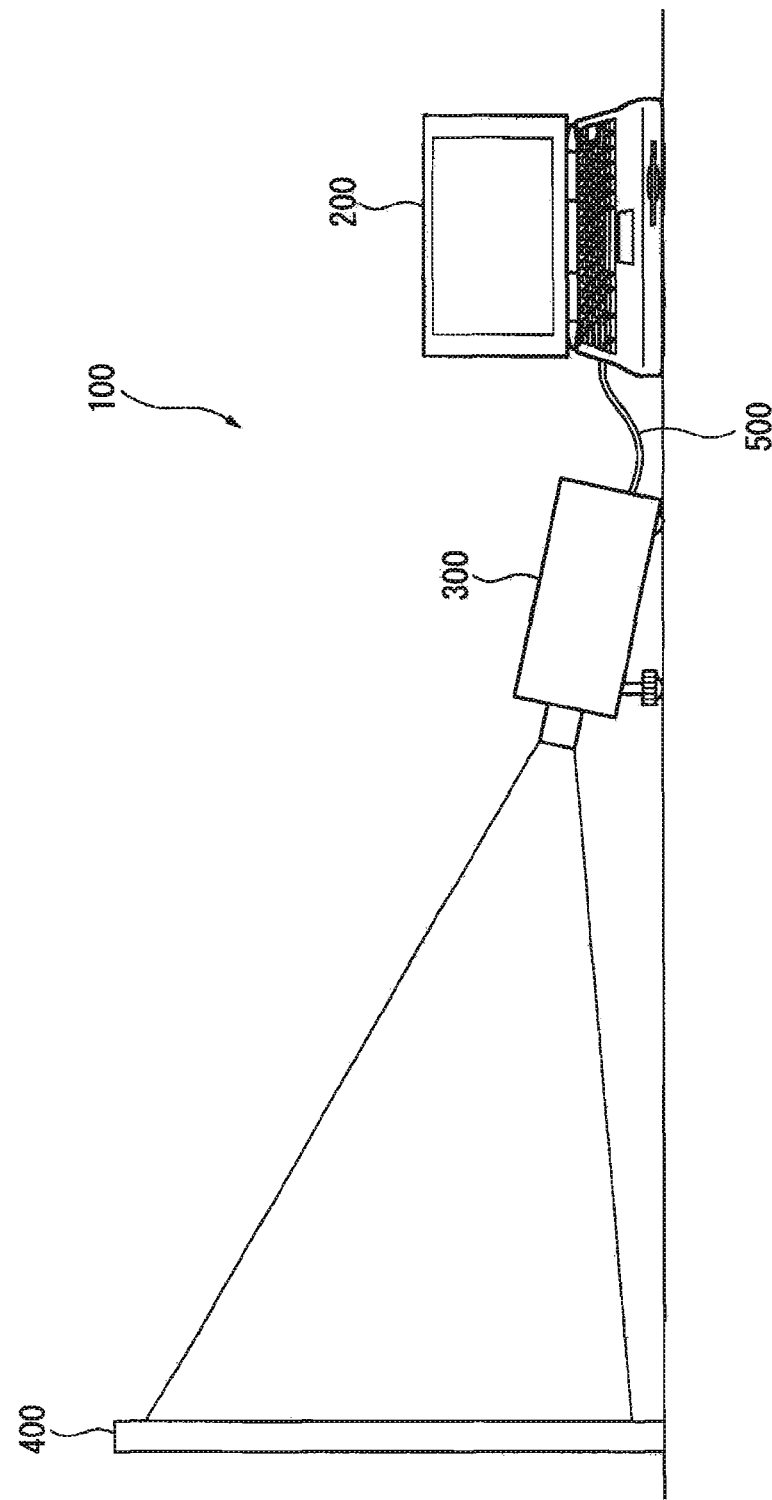
FIG. 1 is an external view of a projection system according to a first embodiment of the invention.

FIG. 1 illustrates an external view of a projection system 100 according to the first embodiment of the invention.

The projection system 100 includes a PC (information processing apparatus) 200, a projector 300, and a USB cable (signal transmission unit) 500. The PC 200 performs predetermined image processing on an image of an image source and outputs an image data signal to the projector 300. The projector 300 generates current-image frames based on the image data signal outputted from the PC 200 and projects the current-image frames towards a screen 400. The USB cable 500 is used to connect the projector 300 and the PC 200 to each other.

Figure 2:
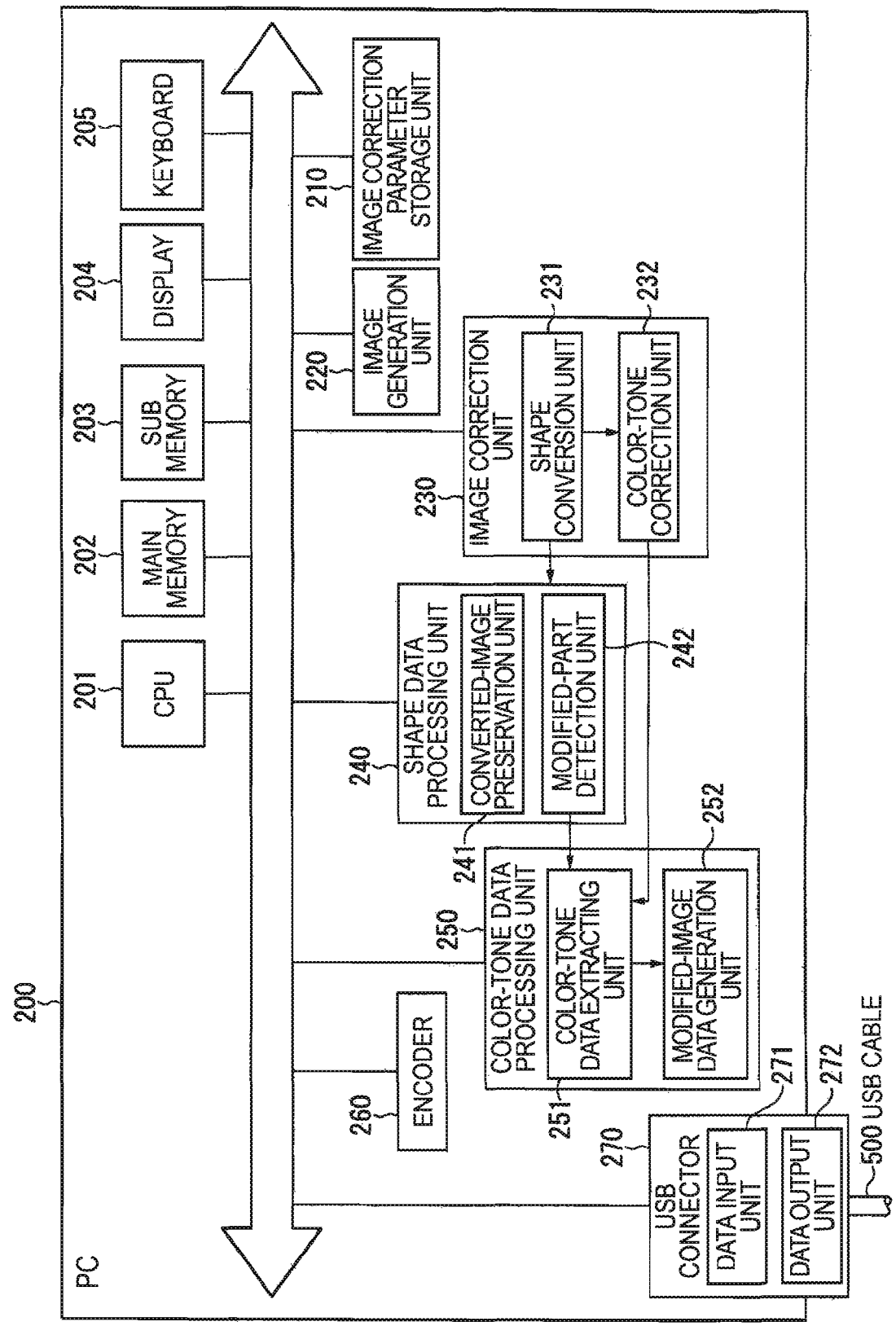
FIG. 2 is a functional block diagram of a PC according to the first embodiment of the invention.
Figure 3:
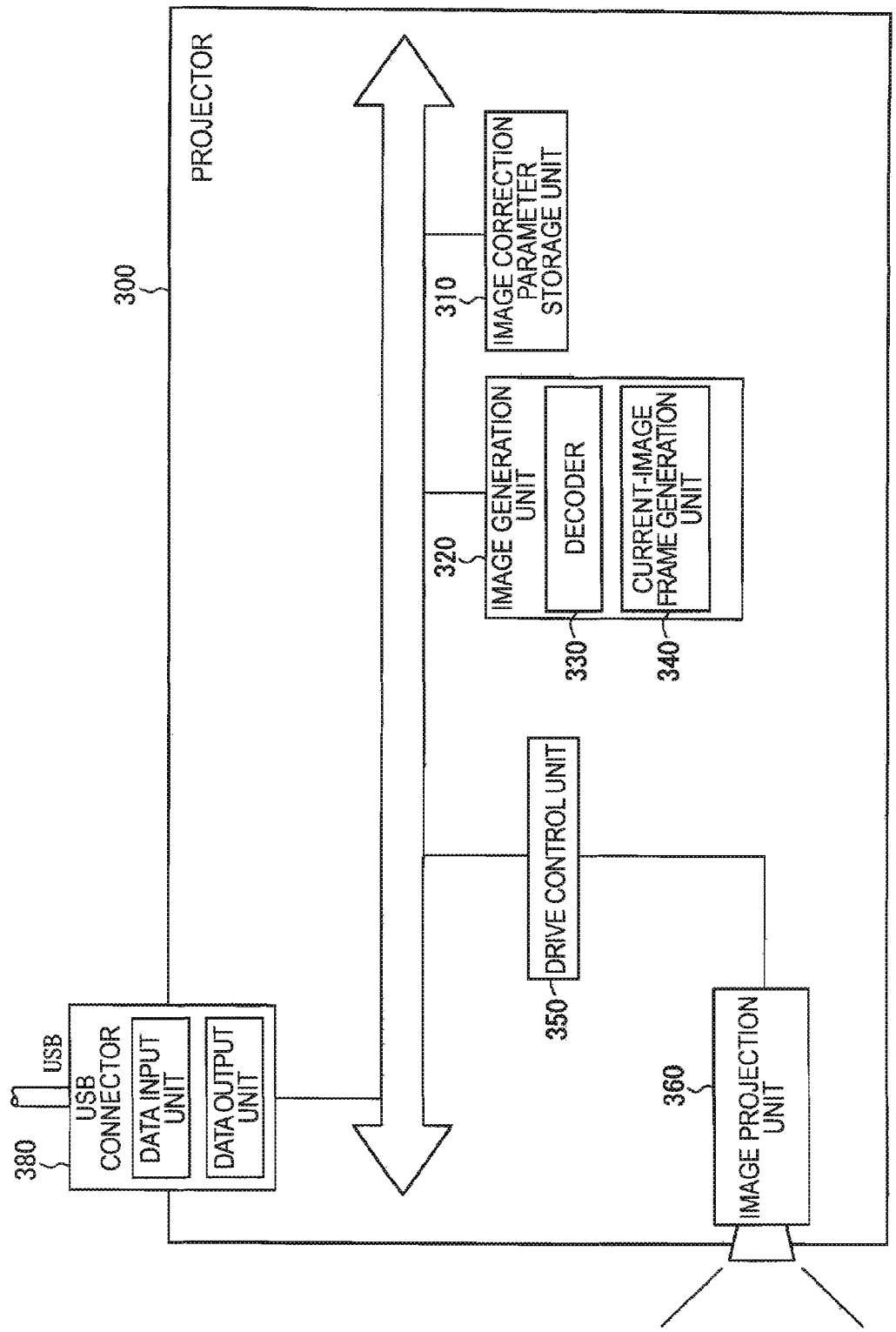
FIG. 3 is a functional block diagram of a projector according to the first embodiment of the invention.
Figure 4:
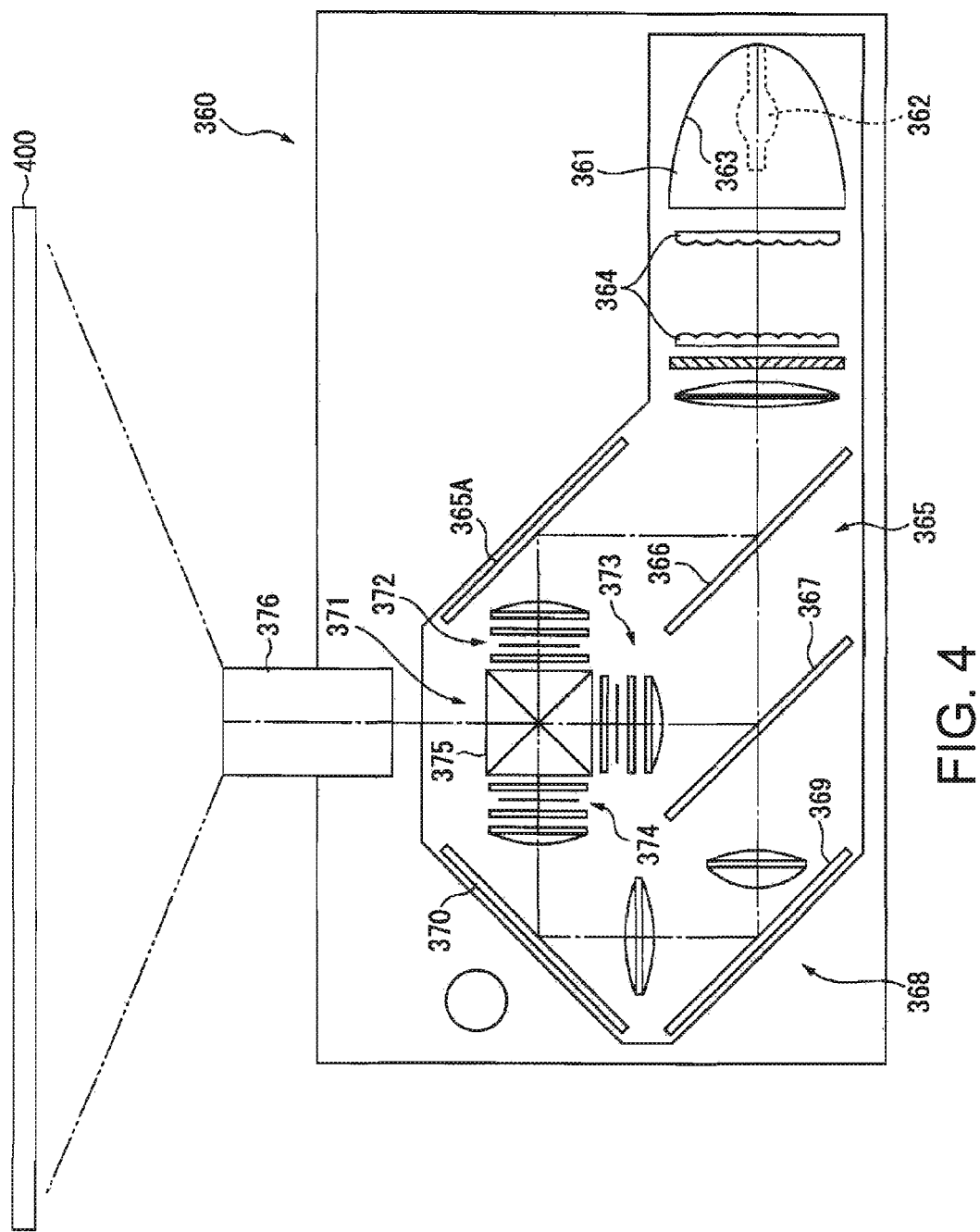
FIG. 4 is a configuration of an image projection unit according to the first embodiment of the invention.

FIG. 2 is a functional block diagram of the PC 200. FIG. 3 is a functional block diagram of the projector 300. FIG. 4 shows a configuration of an image projection unit 360.

As shown in FIG. 2, the PC 200 includes a CPU 201, a main memory 202, a sub memory 203, a display 204, a keyboard 205, an image correction parameter storage unit 210, an image generation unit 220, an image correction unit 230, a shape data processing unit 240, a color-tone data processing unit 250, an encoder 260, and a USB connector 270.

The sub memory 203 is an image source media, such as DVD (digital versatile disk) storing digital data of images and voice. The image correction parameter storage unit 210 stores correction parameters to correct images based on characteristics of the projector 300. Examples of the parameters stored in the image correction parameter storage unit 210 include parameters used for trapezoid correction, unevenness of luminance, unevenness of color, and γ correction.

A memory card or CD-ROM storing the parameters may be inserted to the PC 200 to install the parameters in the image correction parameter storage unit 210. When the PC 200 and the projector 300 are connected to each other via the USB cable 500, the PC 200 may read the parameters from the projector 300 and store the parameters in the image correction parameter storage unit 210.

The image generation unit 220 resolves an image source from the sub memory 203 according to its recording method and decodes image frame data one by one, thereby obtaining image data having, for example, 8-bit color information (RGB colors) with respect to each pixel.

The image correction unit 230 includes a shape conversion unit 231 and a color-tone correction unit 232. The shape conversion unit 231 carries out shape correction, such as trapezoid correction (see FIG. 6), with respect to the image data.

The trapezoid correction implies that when an upper side is elongated relative to a lower side since the upper side is longer in projection length than the lower side due to relative arrangement between the projector 300 and the screen 400 as shown in FIG. 1, it is corrected to the shape of image data beforehand so that the projected image can be properly shaped on the screen 400.

In addition to a case where the projector 300 is placed at the lower side of the screen 400 as shown in FIG. 1, the trapezoid correction is required in a case where an image is projected in an inclined direction with respect to the screen 400. Further, the shape conversion is required in a case where the screen 400 has a curved surface or where a distortion in shape occurs due to a lens incorporated in the projector 300.

The color-tone correction unit 232 corrects color information of image data according to color characteristics of the projector 300. For instance, the color-tone correction unit 232 carries out color conversion, $\gamma$ correction, VT-$\gamma$ correction, or unevenness of color correction with respect to the image data. For instance, 8-bit color information is corrected to 10-bit color information or more.

The shape data processing unit 240 includes a converted-image preservation unit 241 and a modified-part detection unit 242. The converted-image preservation unit 241 stores in turn the image data that is shape-corrected by the shape conversion unit 231. Only a few latest frames of converted image data stored in the converted-image preservation unit 241 are required, and older frames of the converted image data are removed in turn.

The modified-part detection unit 242 compares latest converted-image data, which is shape-corrected by the shape conversion unit 231, with preceding converted-image data, which is preserved in the converted-image preservation unit 241, to detect a modified part.

The color-tone data processing unit 250 includes a color-tone data extracting unit 251 and a modified-image data generation unit 252. The color-tone data extracting unit 251 extracts color information of each pixel in the modified part detected by the modified-part detection unit 242 from image data that is color-tone-corrected by the color-tone correction unit 232. The modified-image data generation unit 252 generates image data of the modified part by adding color information to each pixel in the modified part.

An encoder 260 encodes the image data of the modified part generated by the modified-image data generation unit 252. A USB connector 270 includes a data input unit 271 and a data output unit 272, and exchanges data with the projector 300 via the USE cable 500.

As shown in FIG. 3, the projector 300 includes an image correction parameter storage unit 310, an image generation unit 320, a drive control unit 350, an image projection unit 360, and a USB connector 380. The image correction parameter storage unit 310 stores correction parameters to correct images based on characteristics of the projector 300. Examples of the correction parameters include parameters for trapezoid correction, unevenness of luminance, unevenness of color, and $\gamma$ correction.

The image generation unit 320 includes a decoder 330 and a current-image frame generation unit 340. The decoder 330 demodulates a modified-image data signal transmitted from the PC 200. That is, since the modified-image data signal from the PC 200 is encoded by the encoder 260, it is demodulated by the decoder 330 into image data of the modified part.

The current-image frame generation unit 340 generates a new current-image frame by synthesizing image frame data being currently projected with the image data of the demodulated modified part.

The drive control unit 350 outputs a control signal to drive the image projection unit 360 so that the current-image frame can be displayed.

As shown in FIG. 4, the image protection unit 360 includes a light-source unit 361. Light emitted from a light source 362 becomes parallel light components by a reflector 363, and transmits to a dichroic optical system 365 through two sheets of lens arrays 364.

The dichroic optical system 365 includes a dichroic mirror 366, which reflects red color but transmits blue and green colors, and a dichroic mirror 367, which reflects green color but transmits blue color, such that it divides the light into red, green and blue color components. The red, green and blue color components are reflected by a reflective mirror 365A, a dichroic mirror 367, and two sheets of reflective mirrors 369 and 370, respectively, and are transmitted to liquid crystal panels 372, 373 and 374 for red, green and blue colors, respectively, of an electro-optical device 371. The color components are modulated on the respective liquid crystal panels 372 to 374 according to image information, and synthesized by a prism 375.

The synthesized image is emitted from a protection optical system 376 and is enlarged and projected to the screen 400.

Figure 5:
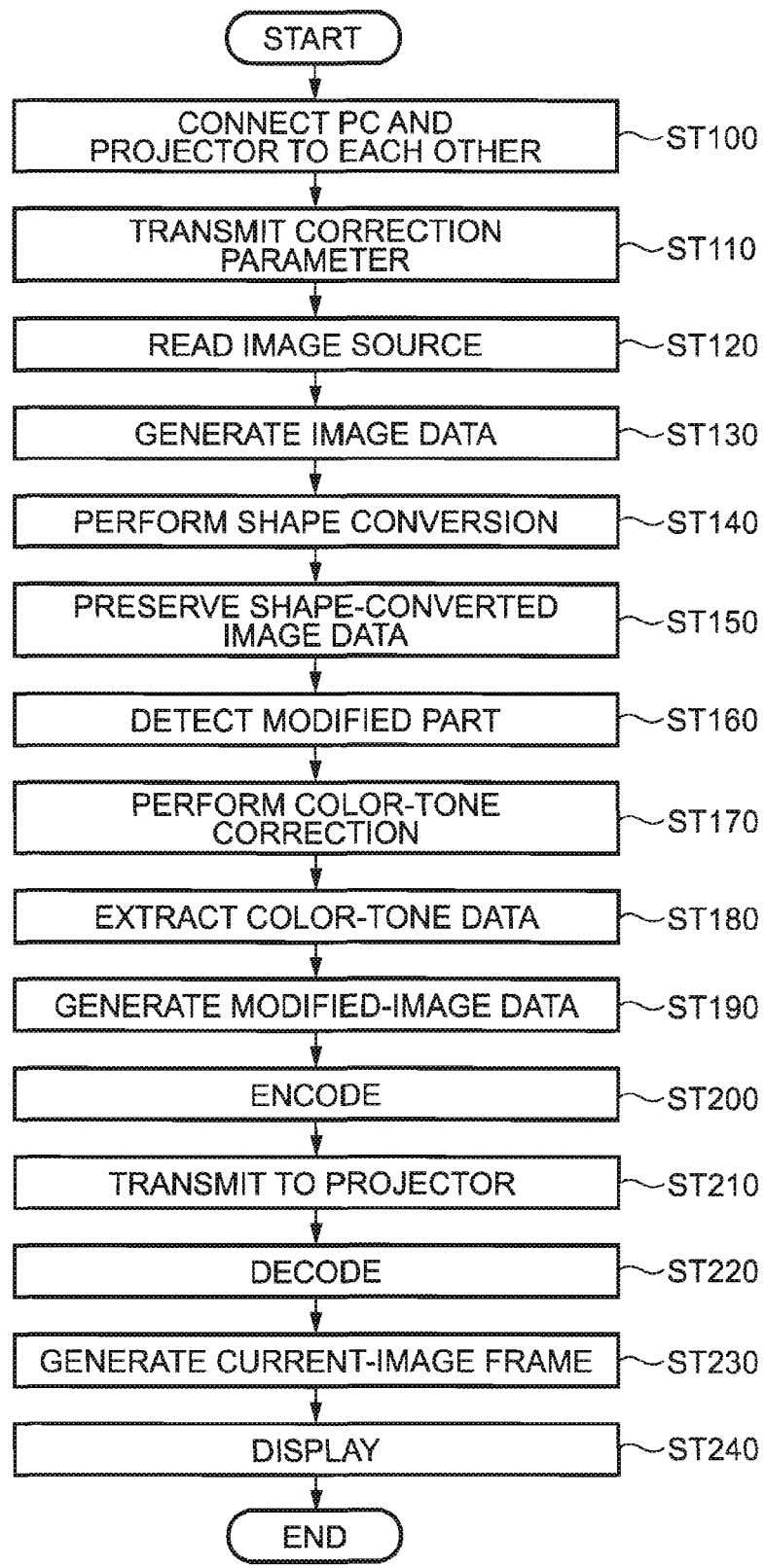
FIG. 5 is a flow chart of a method of projecting an image source from a projector according to the first embodiment of the invention.

Next, a method of protecting an image source from the projector 300 will be described with reference to a flow chart of FIG. 5 and images shown in FIGS. 6 to 8.

At step ST100, the PC 200 and the protector 300 are connected to each other by the USB cable 500. At step ST100, correction parameters stored in the image correction parameter storage unit 310 of the projector 300 are transmitted to the PC 200 via the USB cable 500 and stored in the image correction parameter storage unit 210 of the PC 200.

At step ST120, an image source is read from a DVD of the sub memory 203. At step ST130, the image generation unit 220 generates image data by performing decoding or IP converting of the image source.

Figure 6:
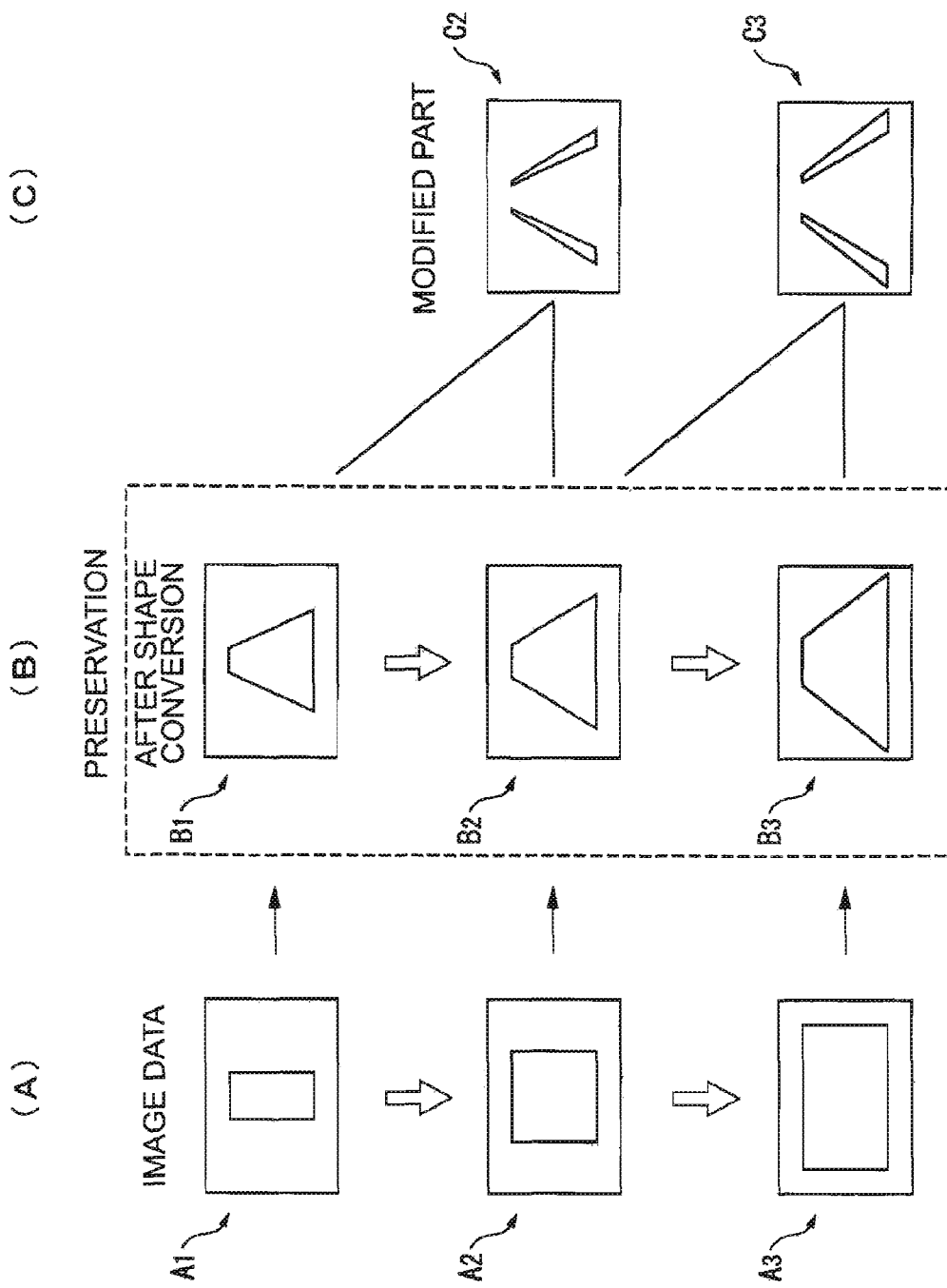
FIG. 6 illustrates a method of processing an image until an image source is projected from a projector according to the first embodiment of the invention.

For instance, the image source is a moving image in which a square becomes thicker in horizontal direction as shown in (A) in FIG. 6. That is, image data generated in the image generation unit 220 becomes image data in which a square becomes thicker like images A1, A2, A3 ... shown in (A) in FIG. 6. The image data generated in the image generation unit 220 is sent to the shape conversion unit 231 in the order of images A1, A2, and A3.

At step ST140, the shape conversion unit 231 carries out shape conversion of the image data. Trapezoid correction will be described with reference to (B) in FIG. 6. In this case, it is assumed that an image is shape-converted in the order of images A1, A2 and A3, image A1 is converted to image B1, image A2 to image B2, and image A3 to image B3.

At step ST150, the shape-converted image data is preserved in the converted-image preservation unit 241. At the same time, the shape-converted image data B1 to B3 is sequentially sent to the modified-part detection unit 242. At step ST160, the modified-part detection unit 242 detects a different part between a latest image and a preceding image.

For instance, when the image A2 is shape-converted to the image B2 in the shape conversion unit 231, the image 32 is sent to the modified-part detection unit 242 and compared with the preceding image B1, and a different part is detected between the images B1 and B2. For example, a part C2 is detected as a modified part when the image B1 is converted to the image B2, a part C3 is detected as a modified part when the image 32 is converted to the image B3.

Figure 7:
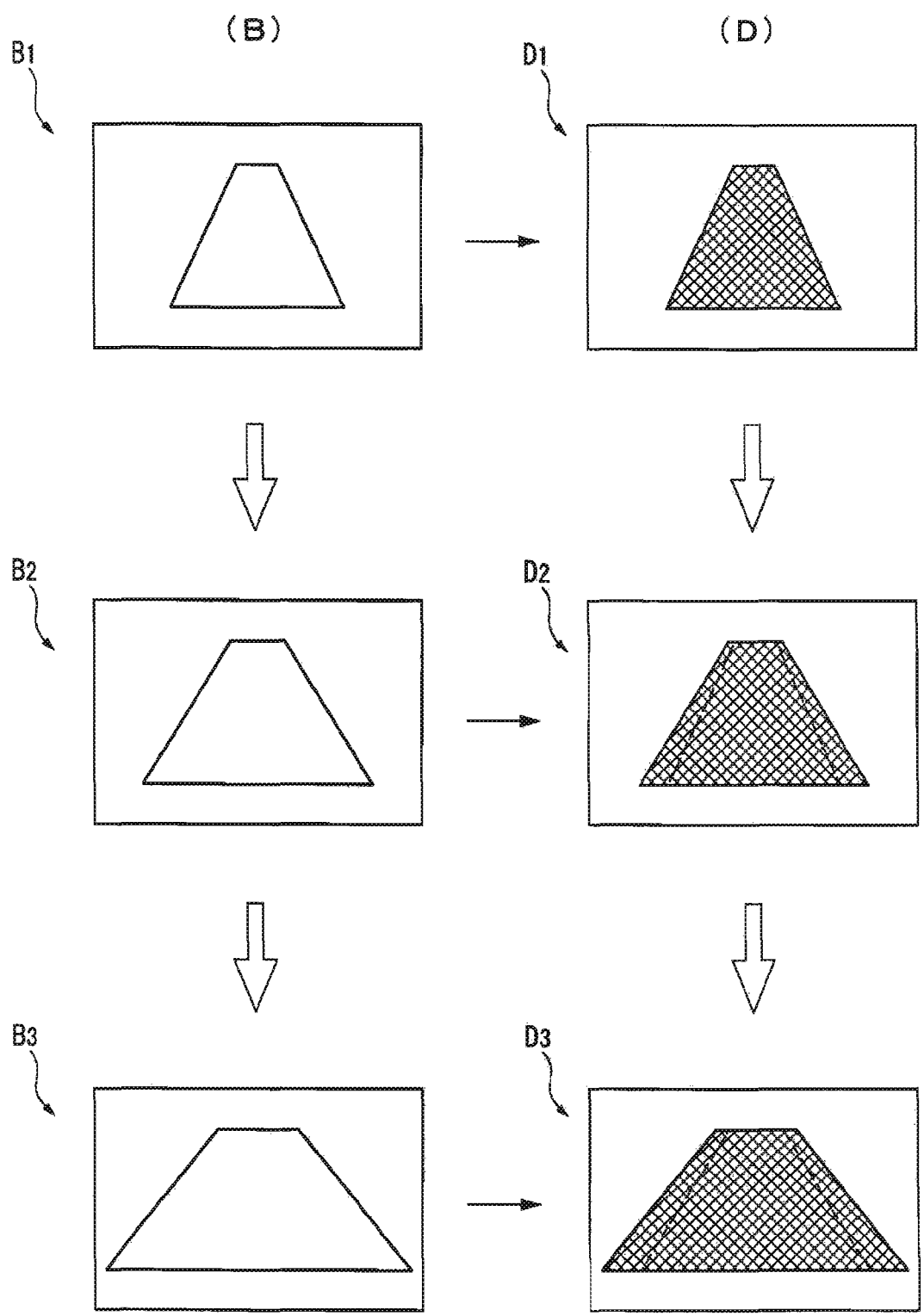
FIG. 7 illustrates a method of processing an image until an image source is projected from a projector according to the first embodiment of the invention.
Figure 8:
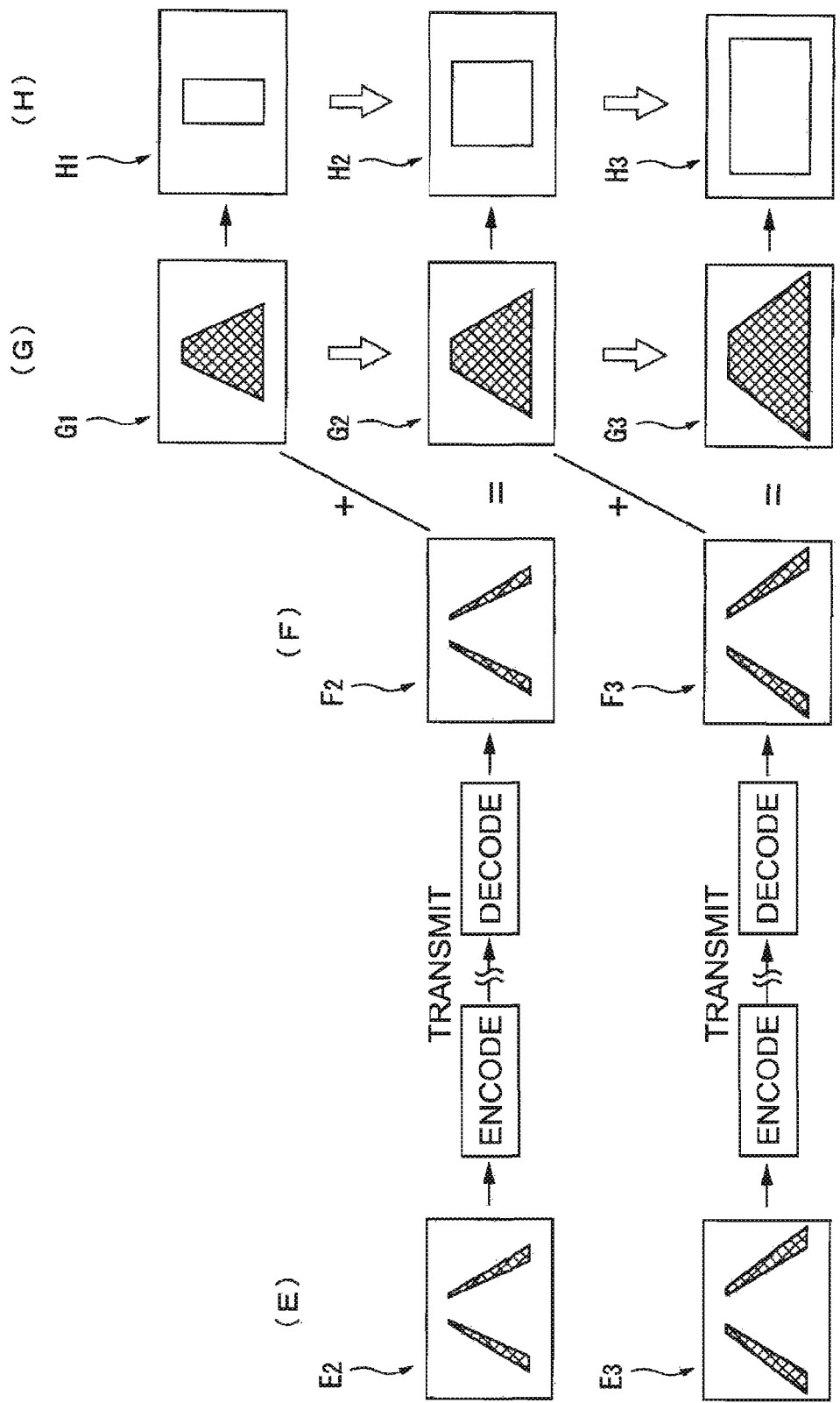
FIG. 8 illustrates a method of processing an image until an image source is projected from a projector according to the first embodiment of the invention.

At step ST170, the color-tone correction unit 232 carries out color-tone correction of the shape-converted image data B1 to B3 (see FIG. 7). That is, the image data B1 to B3 that is shape-converted in the shape conversion unit 231 is sequentially sent to the color-tone correction unit 232. For instance, it is assumed that the shape-converted image data B1 is colortone-corrected to image D1, the image data B2 to image D2, the image data B3 to image D3.

At step ST180, the color-tone data extracting unit 251 extracts color-tone data of each pixel in the modified parts C2 and C3.

In this case, the modified-part detection unit 242 detects the modified parts C2 and C3 between the preceding image and the current image, but does not detect color information in the modified parts. The color-tone data extracting unit 251 compares color-tone-converted image data D1 to D3 with the modified parts C2 and C3 to detect pixels of the color-tone-converted images D1 to D3 corresponding to each pixel in the modified part and extract color-tone data from the color-tone-converted images D1 to D3.

At step ST190, the modified-image data generation unit 252 generates image data of the modified part having color information of each pixel of the modified part by adding color-tone data of each pixel extracted from the color-tone data extracting unit 251 to each pixel of the modified part. For instance, a modified image E2 is generated by adding color-tone information to the modified part C2, and a modified image E3 is generated by adding color-tone information to the modified part C3 (see FIG. 8).

At step ST200, the encoder 260 encodes the modified images E2 and E3 generated in the modified-image data generation unit 252. At step ST210, the encoded, modified images E2 and E3 are transmitted to the projector 300 via the USB cable 500.

At step ST220, the decoder 330 demodulates data signals of the transmitted modified images E2 and E3. For instance, it is assumed that the modified image E2 is demodulated into a modified image F2, and the modified image E3 into a modified image F3 (see FIG. 8).

At step ST230 the current-image frame generation unit 340 generates a next current-image frame by synthesizing the demodulated modified images F2 and F3 with the current-image frame data being currently projected. For example, when an image H1 is displayed on the screen 400 by projecting a current image G1 on the screen 400, a next current-image frame G2 is generated by synthesizing the current-image G1 with the modified image F2. Similarly, when an image H2 is displayed on the screen 400 by projecting the current image G2 on the screen 400, a next current-image frame G3 is generated by synthesizing the current-image G2 with the modified image F3.

At step ST240, current images are sequentially projected on the screen 400 to display the image.

In more detail, the drive control unit 350 outputs a control signal to the image projection unit 360 so that the current images G1 to G3 generated in the current-image frame generation unit 340 can be displayed. The images projected from the image projection unit 360 are projected on the screen 400.

Accordingly, the first embodiment has the following effects: (1) Since the PC 200 carries out image processing, such as shape conversion, and transmits image data signals to the projector 300, the projector 300 needs not to have complex functions for image processing, thereby simplifying the construction of projector 300. That is, the projector 300 has a simple construction including the image generation unit 320 and the image projection unit 360, such that the projector 300 becomes compact and inexpensive.

(2) The PC 200 originally has a graphic function, shape-correction function, and color-tone-correction function. Accordingly, the PC 200 has only to have necessary parameters without providing additional image processing functions.

In addition, the PC 200 having graphic function can perform high-speed and accurate image processing.

(3) Since the PC 200 transmits to the projector 300 the modified-image data containing the modified part and color-tone data of the modified part, it is possible to significantly reduce the amount of data to be transmitted, for example, compared to a case where all data constituting a single image frame are transmitted.

Accordingly, even though the USB cable 500 having a limited transmission rate is used, it is possible to maintain a proper frame rate on the projector 300 by transmitting a necessary amount of data at a predetermined rate.

(4) Since the PC 200 detects the modified part by comparing shape-converted image data converted in the shape conversion unit 231 with each other and detects a modified portion of the shape after processing, it is possible to properly detect the modified portion of shape. As a result, the projector 300 can generate the current-image frame data based on the modified image data to properly display the image.

(5) Since the modified image data has the modified part and color-tone data, it is not necessary to obtain the color information from differential data to generate the current-image frame data using the projector 300. Accordingly, it is possible to simplify the construction of projector 300 by reducing the functions necessary to the projector.

(6) The modified-part detection unit 242 detects the modified part by comparing the image data with each other prior to performing color-tone correction. Once color-tone correction is carried out, color information of each pixel is accurately corrected. Thus, when the image data are compared with each other after the color-tone correction, the image is detected to be roughly wholly modified. However, in the present embodiment, since the modified part is detected by comparing the image data with each other after shape conversion but prior to performing color-tone correction, it is possible to properly detect the modified part of the image source.

Second Embodiment

Next, a second embodiment of the invention will be described with reference to FIGS. 9 to 11.

A basic construction of the second embodiment is similar to that of the first embodiment except that when a modified part is detected, color-tone-converted image data are compared with each other.

Figure 9:
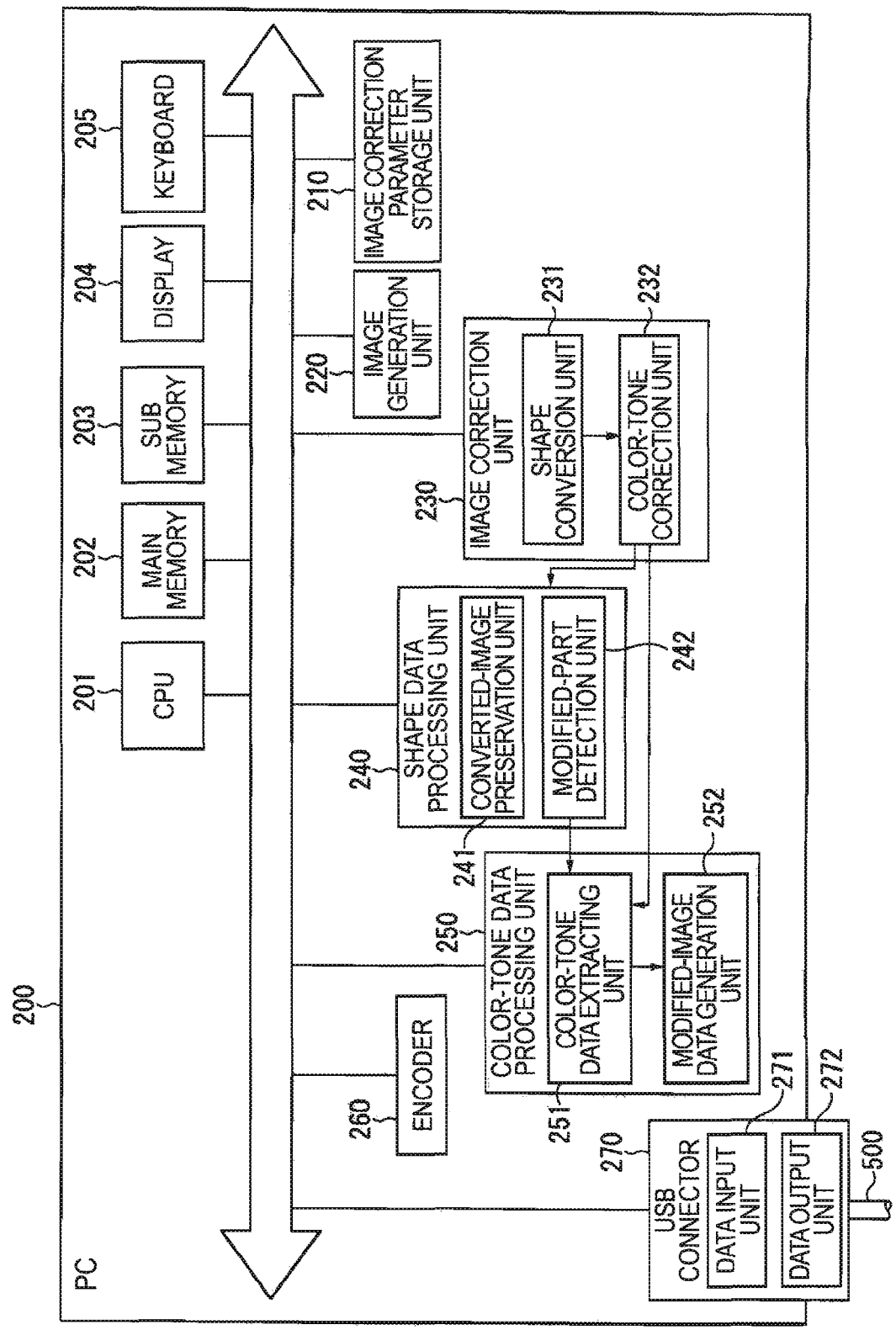
FIG. 9 is a functional block diagram of a PC according to a second embodiment of the invention.

FIG. 9 is a functional block diagram of the PC 200 according to the second embodiment of the invention.

Referring to FIG. 9, an image correction unit 230 includes a shape conversion unit 231 and a color-tone correction unit 232.

Similarly to the first embodiment, image data generated by the image generation unit 220 is shape-corrected (trapezoid corrected) in the shape conversion unit 231.

The image data that is shape-converted by the shape conversion unit 231 is transmitted to the color-tone correction unit 232, which corrects color-tone of the image data.

The image data that is color-tone-corrected by the color-tone correction unit 232 is transmitted to the shape data processing unit 240, and is preserved in the converted-image preservation unit 241.

The color-tone-corrected image data is transmitted to the modified-part detection unit 242. Latest color-tone-corrected image data and preceding image data preserved in the converted-image preservation unit 241 are compared with each other. A different part between the latest image and the preceding image is detected as a modified part.

According to the first embodiment, the converted-image preservation unit 241 preserves the image data that is shape-converted by the shape conversion unit 231, and the modified-part detection unit 242 detects the modified part by comparing the image data that are shape-converted by the shape conversion unit 231. However, according to the second embodiment, the modified part is detected by the image data that are shape-converted and then color-tone-corrected.

The color-tone data processing unit 250 is the same as that of the first embodiment in that the color-tone data extracting unit 251 extracts color information of each pixel in the modified part from the image data that is color-tone-corrected by the color-tone correction unit 232, and the modified-image data generation unit 252 generates image data of the modified part in which color information is added to each pixel of the modified part.

A method of projecting an image source from the projector 300 will be described with reference to a flow chart of FIG. 10 and an image shown in FIG. 11.

Figure 10:
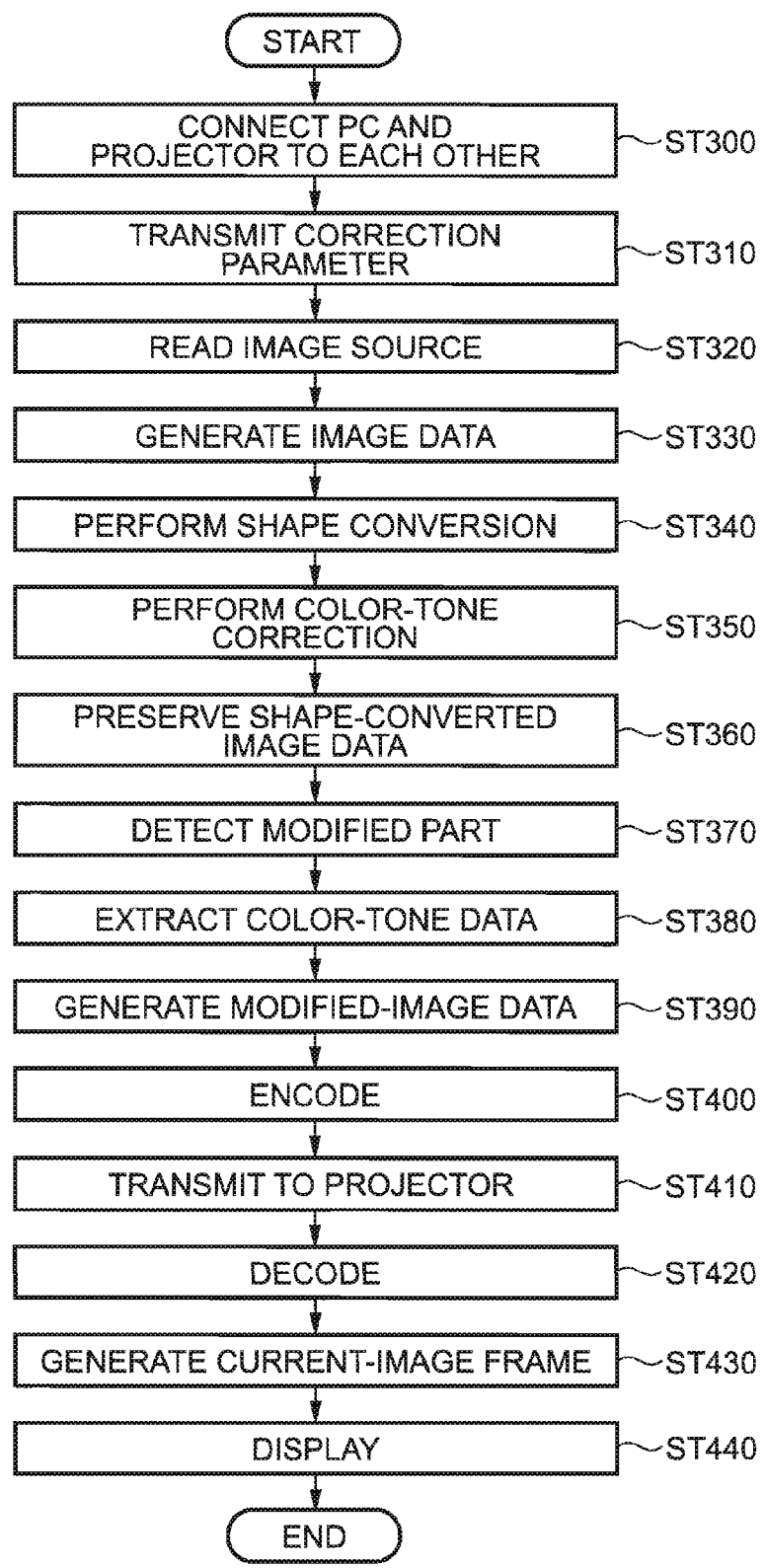
FIG. 10 is a flow chart of a method of projecting an image source from a projector according to the second embodiment of the invention.

In FIG. 10, steps ST300 to ST340 are the same as steps ST100 to ST140 of the first embodiment. That is, operation of performing trapezoid correction (J) of an image source (I) in FIG. 11 is the same as that of the first embodiment.

At step ST340, the shape conversion unit 231 carries out shape conversion. At step ST350, the color-tone correction unit 232 carries out color-tone correction. A shape-converted image J becomes a color-tone-corrected image K.

At step ST360, the color-tone-corrected image K is preserved in the converted-image preservation unit 241. At step ST370, the color-tone-converted image data is compared with a preceding color-tone-converted image, such that a modified-part is detected in the modified-part detection unit 242 ((L) in FIG. 11).

At step ST380, the color-tone data extracting unit 251 extracts color-tone data of each pixel in the modified part by comparing the color-tone-converted image K with the modified part L.

Figure 11:
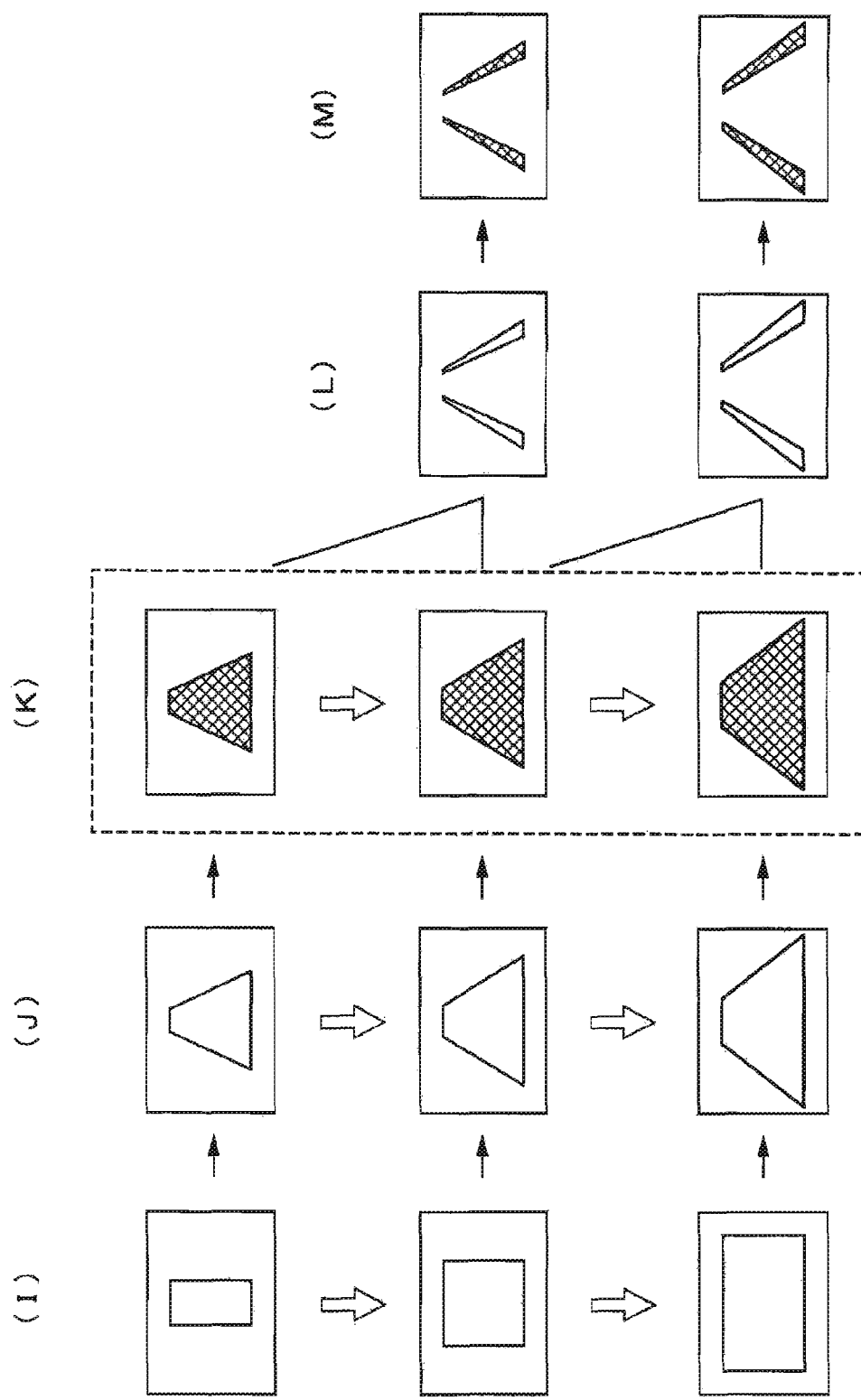
FIG. 11 illustrates a method of processing an image until an image source is projected from a projector according to the second embodiment of the invention.

At step ST390, the modified-image data generation unit 252 generates modified-image data by adding the extracted color-tone data to each pixel of the modified part ((M) in FIG. 11).

Steps ST400 to ST440 are the same as those of the first embodiment.

That is, after the modified-image data M is transmitted to the projector 300 via the USB cable 500, a current-image frame is generated in the projector 300 and an image is projected on the screen 400.

The second embodiment further has the following effect compared to the first embodiment.

(7) Since shape conversion is performed and then color-tone correction is performed, the shape conversion and color-tone correction can be successively carried out through a series of graphic processes of the PC 200. For instance, in the first embodiment in which the modified part is detected after shape conversion and before color-tone correction, since the image data is sent to the modified-part detection unit 242 after the shape conversion, a series of graphic processes of the shape conversion and color-tone correction needs to be interrupted.

Accordingly, since a series of graphic processes of the shape conversion and color-tone correction is successively performed in the second embodiment, it is possible to perform high-speed graphic processing.

Third Embodiment

Next, a third embodiment of the invention will be described with reference to FIGS. 12 to 14.

A basic construction of the third embodiment is the same as that of the second embodiment except generation of an image preserved in the PC 200.

Figure 12:
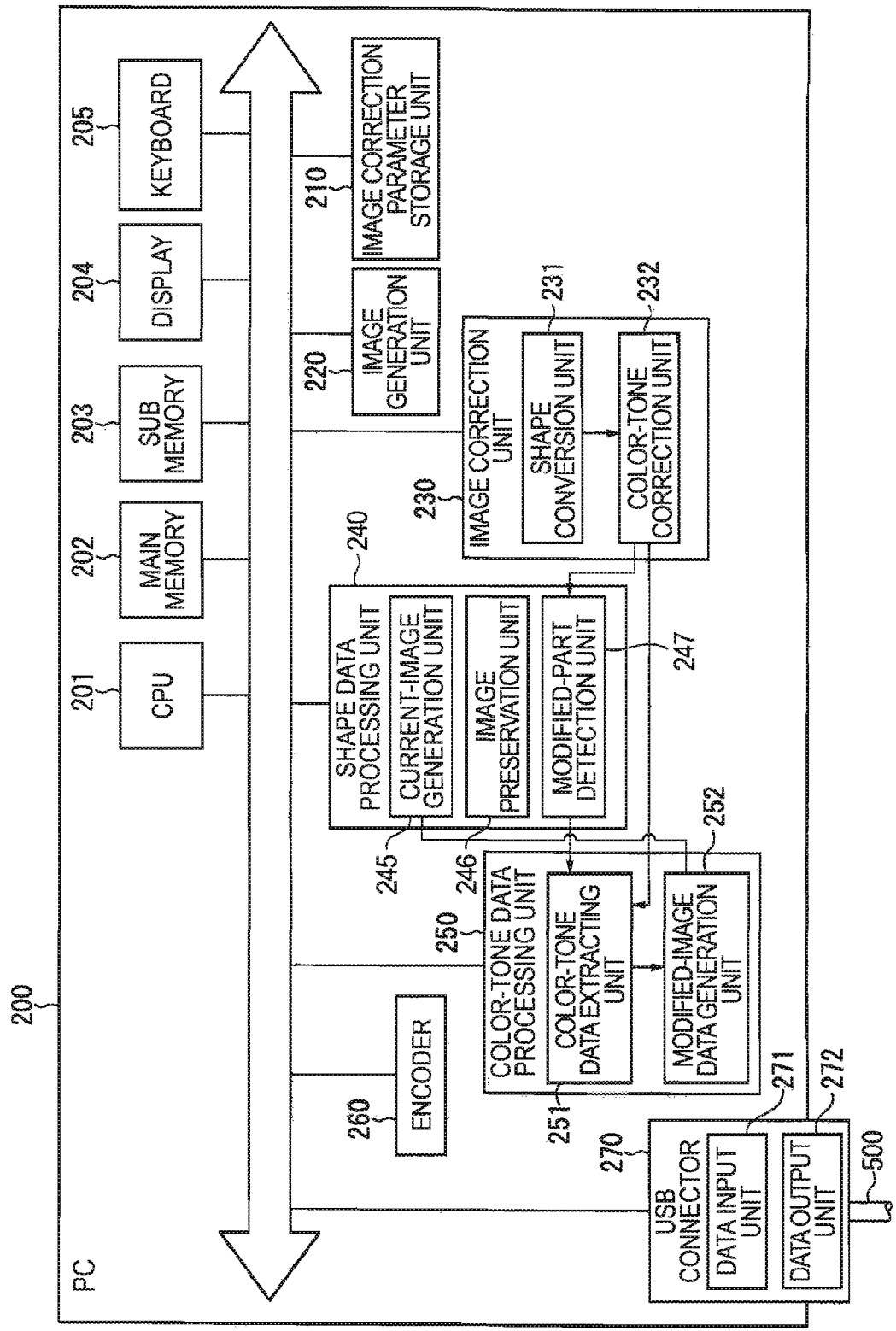
FIG. 12 is a functional block diagram of a PC according to a third embodiment of the invention.

That is, referring to FIG. 12, since the modified-image data generation unit 252 generates modified-image data to be transmitted to the projector 300, the modified-image data is transmitted to the projector 300 and, at the same time, is fed back to the shape data processing unit 240. A current-image generation unit 245 of the shape data processing unit 240 generates current-image frame data based on the modified-image data. The current-image frame generated by the current-image generation unit 245 is preserved sequentially in the image preservation unit 246, and is used as the image data for comparison at the time of detecting the modified part in the modified-part detection unit 247.

Referring to FIG. 12, the image correction unit 230 includes a shape conversion unit 231 and a color-tone correction unit 232.

The image data generated in the image generation unit 220 is shape-corrected (trapezoid-corrected) in the shape conversion unit 231, and is color-tone-corrected in the color-tone correction unit 232. The image data that is color-tone-corrected in the color-tone correction unit 232 is sent to the shape data processing unit 240.

The shape data processing unit 240 includes a current-image generation unit 245, an image preservation unit 246, and a modified-part detection unit 247.

The current-image generation unit 245 receives modified-image data generated by the modified-image data generation unit 252. The current-image generation unit 245 generates latest image frame data based on the modified image generated by the modified-image data generation unit 252. That is, this is similar to a case where the protector 300 generates the current-image frame data from the modified-image data.

The image preservation unit 246 preserves the image data generated by the current-image generation unit 245.

The modified-part detection unit 242 compares the latest shape-converted, color-tone-corrected image data with preceding converted-image data preserved in the image preservation unit, and detects as a modified part a different part between the latest image and the preceding image.

A method of projecting an image source from the projector 300 will be described with reference to a flow chart of FIG. 13 and an image shown in FIG. 14.

Figure 13:
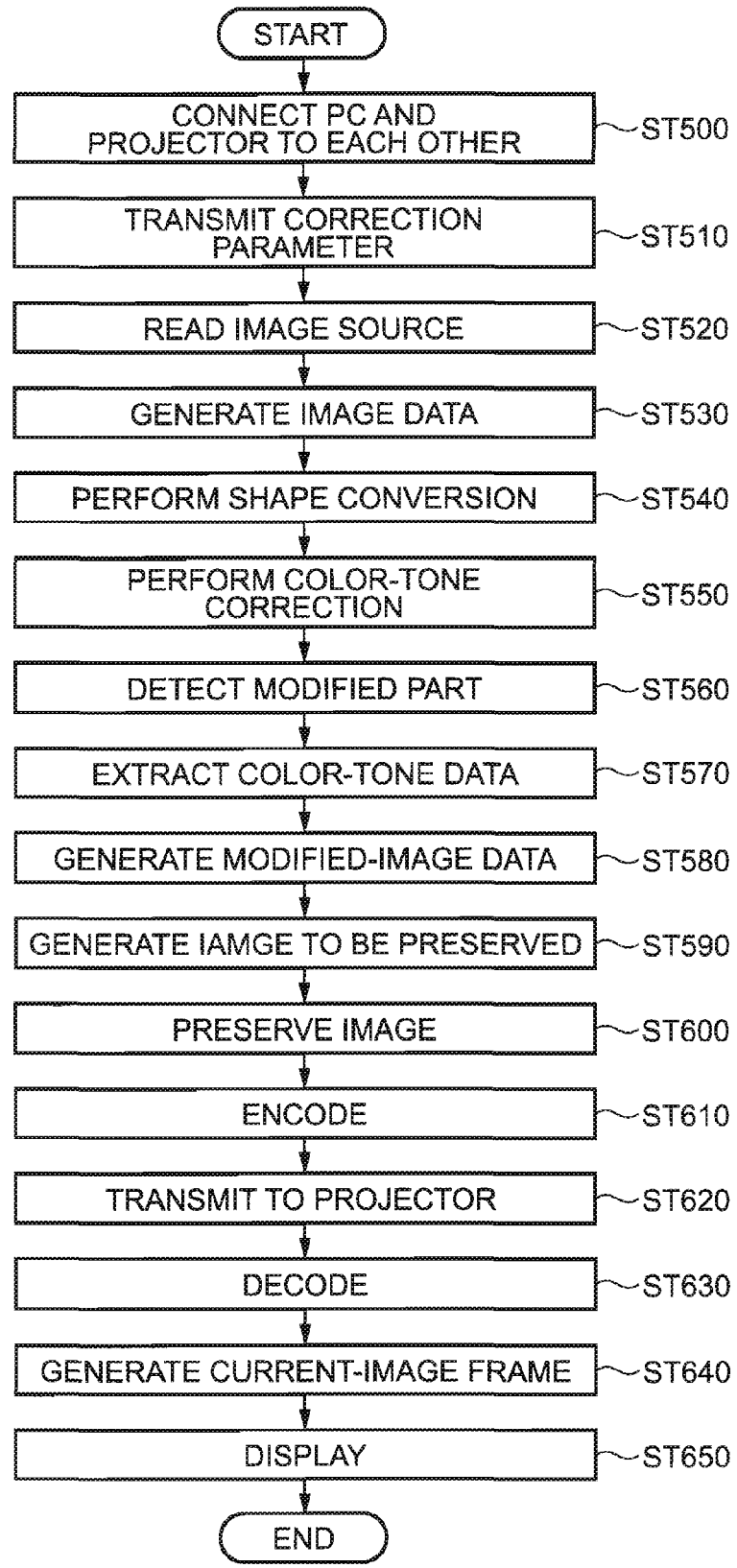
FIG. 13 is a flow chart of a method of projecting an image source from a projector according to the third embodiment of the invention.

In FIG. 13, steps ST500 to ST550 are the same as the steps ST300 to ST350 of the second embodiment. That is, operation of performing trapezoid correction (O) and color-tone correction (P) of an image source (N) in FIG. 14 is the same as that of the second embodiment.

At step ST560, the modified-part detection unit 242 detects a modified part Q by comparing color-tone-converted image data with preceding image frame data. At step ST570, the color-tone data extracting unit 251 extracts color-tone data of each pixel in the modified part by comparing the color-tone-converted image P with the modified part Q.

Figure 14:
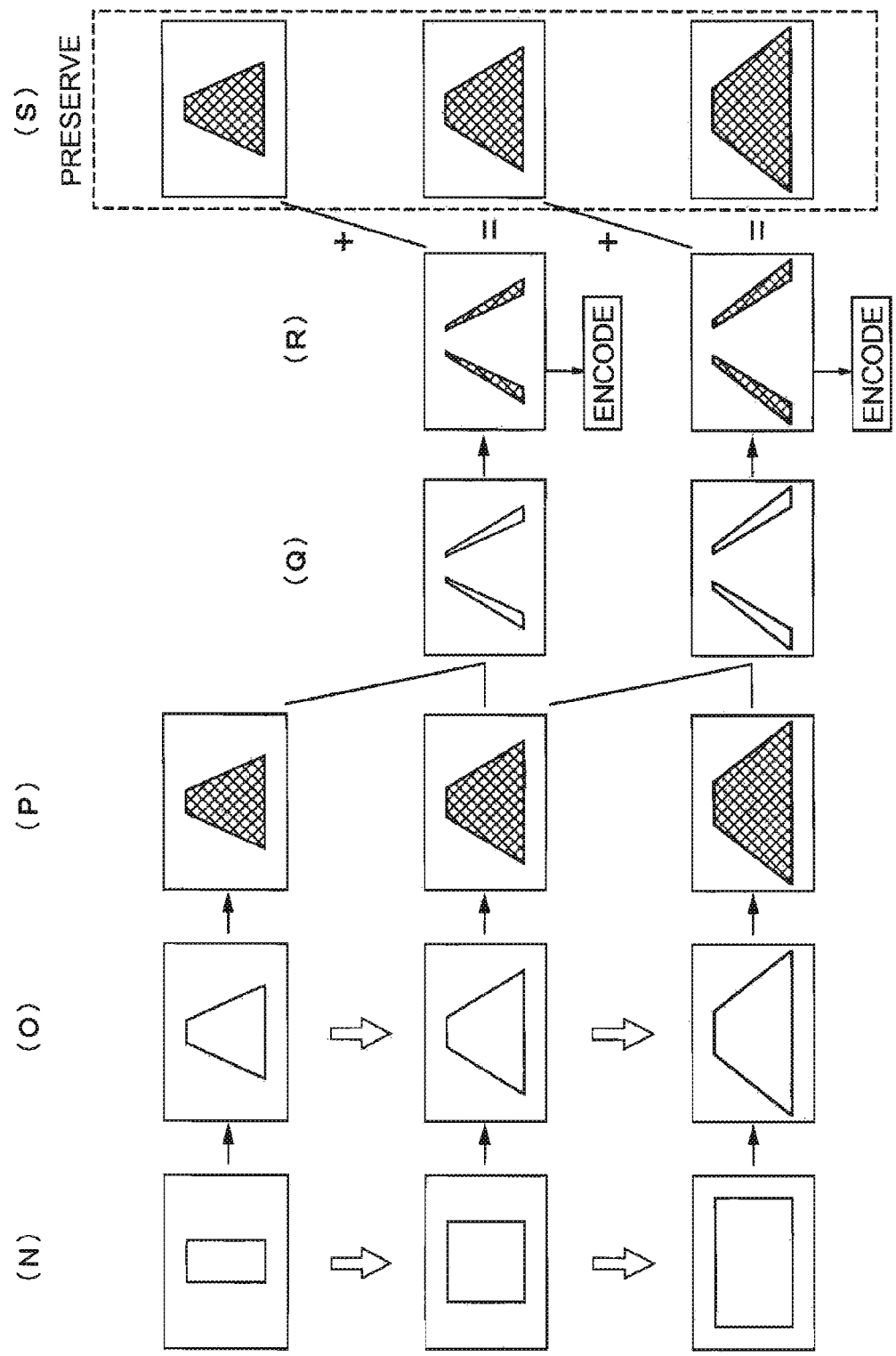
FIG. 14 illustrates a method of processing an image until an image source is projected from a projector according to the third embodiment of the invention.

At step ST580, the modified-image data generation unit 252 generates modified-image data by adding the extracted color-tone data to each pixel of the modified part ((R) in FIG. 14).

At step ST590, the modified-image data is fed back to the shape data processing unit 240, and the current-image generation unit generates new current-image frame data S by synthesizing the modified-image data with the preceding image frame data.

At step ST600, the current-image frame data generated by the current-image generation unit is preserved in the image preservation unit.

At step ST610, the modified-image data generated by the modified-image data generation unit 252 is encoded by the encoder 260, and, at step ST620, is transmitted to the projector 300 via the USB cable 500.

Next, steps ST620 to ST650 are the same as those of the first embodiment.

That is, the modified-image data R is transmitted to the projector 300 via the USB cable 500. A current-image frame is generated in the projector 300, and an image is projected on the screen 400.

The third embodiment further has the following effect compared to the above-mentioned embodiments.

(8) Since the modified-image data generated by the modified-image data generation unit 252 is fed back to the current-image generation unit and the current-image frame data is generated in the current-image generation section, the current-image generation unit can receive the same image data as that transmitted from the PC 200 to the projector 300, and generate image data equal to the current-image frame data that is currently preserved in the projector 300. Since the current-image data generated by the current-image generation unit and the latest shape-converted image data are compared with each other, it is possible to detect a modified part of the latest shape-converted image data that is modified from the same current-image data as that preserved in the projector 300. As a result, the projector can properly generate the latest current-image frame data by transmitting the generated modified-image data to the projector 300.

While the invention has been described with reference to exemplary embodiments thereof, it will be understood by those skilled in the art that various changes in form and details may be made therein without departing from the scope of the invention as defined by the following claims.

Even though the above-mentioned embodiments describe a case where the modified-image data is transmitted from the PC to the projector, the shape-converted and color-tone-converted image data may be transmitted from the PC to the projector in predetermined timing. In a case where the modified-image data is transmitted from the PC to the projector, the image data preserved in the PC and projector are different from each other. Accordingly, it is preferable that the entire image data is transmitted from the PC to the projector in an appropriate timing so that the image data preserved in the PC and projector can be equal to each other. However, since the third embodiment is configured such that the PC and the projector have the same image data, it is not necessary to transmit the entire image data from the PC to the projector.

Signals may be transmitted from the PC to the projector in a wireless manner instead of via the USB cable.

The present invention may be applied to a projection system.

The entire disclosure of Japanese Patent Application No. 2005-262759, filed Sep. 9, 2005 is expressly incorporated by reference herein.

What is claimed is:

1. A projection system comprising:
    an information processing apparatus that carries out image processing on an input image source;
    a projector that projects an image on a screen based on an image data signal outputted from the information processing apparatus; and
    a signal transmission unit that carries signals between the information processing apparatus and the projector,
    wherein the information processing apparatus includes:
    a shape conversion unit that generates shape-converted image data converted such that the image data is properly represented on the screen when the image data is projected from the projector towards the screen;
    a converted-image preservation unit that sequentially preserves the shape-converted image data that is shape-converted by the shape conversion unit;
    a modified-part detection unit that compares latest shape-converted image data, which is shape-converted by the shape conversion unit, with preceding shape-converted image data, which is preserved in the converted-image preservation unit, and detects, as a modified part, part of the latest shape-converted image data that is modified from the preceding shape-converted image data, the preceding shape-converted image data being generated based on a first image data which represents a first image to be displayed, the latest shape-converted image data being generated based on a second image data which represents a second image to be displayed and the second image being displayed after the first image is displayed; and
    a modified-image data generation unit that generates modified-image data of the modified part by adding color-tone data to each pixel in the modified part detected by the modified-part detection unit, and
    wherein the projector includes a current-image frame generation unit that generates a new current-image frame including the modified-image data from the information processing apparatus.

2. The projection system according to claim 1, wherein the information processing apparatus includes:
    a color-tone correction unit that performs color-tone correction of the shape-converted image data that is shape-converted by the shape conversion unit according to color characteristics of the projector; and
    a color-tone data extracting unit that extracts color information of each pixel in the modified part detected by the modified-part detection unit from the image data that is color-tone-corrected by the color-tone correction unit,
    wherein the modified-image data generation unit generates modified-image data by adding the color information extracted from the color-tone data extracting unit to each pixel in the modified part, and
    the modified-part detection unit detects a modified part by comparing shape-converted image data with each other that are shape-converted by the shape conversion unit but are not color-tone-corrected by the color-tone correction unit.

3. The projection system according to claim 2, wherein the information processing apparatus includes a color-tone data extracting unit that extracts color information of each pixel in the modified part detected by the modified-part detection unit from the image data that is color-tone-corrected by the color-tone correction unit, and
    wherein the modified-image data generation unit generates modified-image data by adding the color information extracted from the color-tone data extracting unit to each pixel in the modified part.

4. The projection system according to claim 2, wherein the information processing apparatus transmits the entire shape-converted, color-tone-corrected image data rather than the modified-image data to the projector in predetermined timing.

5. The projection system according to claim 1, wherein the information processing apparatus includes a color-tone correction unit that carries out color-tone correction of the shape-converted image data that is shape-converted by the shape conversion unit according to color characteristics of the projector, wherein the converted-image preservation unit preserves sequentially the shape-converted image data that is color-tone-corrected by the color-tone correction unit, and wherein the modified-part detection unit compares latest shape-converted image data, which is color-tone-corrected by the color-tone correction unit, with preceding color-tone-corrected, shape-converted image data, which is preserved in the converted-image preservation unit, and detects, as a modified part, part of the latest shape-converted image data that is modified from the preceding shape-converted image data.

6. A projection system comprising:

an information processing apparatus that carries out image processing on an input image source;

a projector that projects an image on a screen based on an image data signal outputted from the information processing apparatus; and a signal transmission unit that carries signals between the information processing apparatus and the projector, wherein the information processing apparatus includes:

a shape conversion unit that generates shape-converted image data converted such that the image data is properly represented on the screen when the image data is projected from the projector towards the screen;

a modified-part detection unit that compares latest shape-converted image data, which is shape-converted by the shape conversion unit, with preceding shape-converted image data, and detects, as a modified part, part of the latest shape-converted image data that is modified from the preceding shape-converted image data, the preceding shape-converted image data being generated based on a first image data which represents a first image to be displayed, the latest shape-converted image data being generated based on a second image data which represents a second image to be displayed and the second image being displayed after the first image is displayed;

a modified-image data generation unit that generates modified-image data of the modified part by adding color information to each pixel in the modified part detected by the modified-part detection unit;

a current-image generation unit that generates latest current-image data including the modified-image data generated by the modified-image data generation unit; and an image preservation unit that preserves image data generated by the current-image generation unit, wherein the modified-part detection unit compares latest shape-converted image data, which is shape-converted by the shape conversion unit, with preceding image data, which is preserved in the image preservation unit, and detects, as a modified part, part of the latest shape-converted image data that is modified from the preceding shape-converted image data.

7. An information processing apparatus performing image processing on an input image source, outputting and displaying the image-processed image source on a projector connected via a signal transmission unit, the information processing apparatus comprising:

a shape conversion unit that generates shape-converted image data converted such that the image data is properly represented on the screen when the image data is projected from the projector towards the screen;

a converted-image preservation unit that preserves the shape-converted image data that is shape-converted by the shape conversion unit;

a modified-part detection unit that compares latest shape-converted image data, which is shape-converted by the shape conversion unit, with preceding shape-converted image data, which is preserved in the converted-image preservation unit, and detects, as a modified part, part of the latest shape-converted image data that is modified from the preceding shape-converted image data, the preceding shape-converted image data being generated based on a first image data which represents a first image to be displayed, the latest shape-converted image data being generated based on a second image data which represents a second image to be displayed and the second image being displayed after the first image is displayed; and a modified-image data generation unit that generates the modified-image data of the modified part by adding color-tone data to each pixel in the modified part detected by the modified-part detection unit.

* * * * *